(12) United States Patent
Shenfield et al.

(10) Patent No.: US 7,448,043 B2
(45) Date of Patent: Nov. 4, 2008

(54) SYSTEM AND METHOD OF COMPACT MESSAGING IN NETWORK COMMUNICATIONS BY REMOVING TAGS AND UTILIZING PREDEFINED MESSAGE DEFINITIONS

(75) Inventors: Michael Shenfield, Richmond Hill (CA); Bryan R. Goring, Milton (CA)

(73) Assignee: Research in Motion Limited, Waterloo, ON (CA)

( * ) Notice: Subject to any disclaimer, the term of this patent is extended or adjusted under 35 U.S.C. 154(b) by 729 days.

(21) Appl. No.: 10/778,547

(22) Filed: Feb. 17, 2004

(65) Prior Publication Data

US 2004/0194105 A1    Sep. 30, 2004

Related U.S. Application Data

(60) Provisional application No. 60/503,777, filed on Sep. 17, 2003, provisional application No. 60/447,429, filed on Feb. 14, 2003.

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................................... 719/313
(58) Field of Classification Search ................ 719/313
See application file for complete search history.

(56) References Cited

U.S. PATENT DOCUMENTS 6,330,574 B1 * 12/2001 Murashita .................. 715/513
6,883,137 B1 *  4/2005 Girardot et al. ............. 715/513
6,959,300 B1 * 10/2005 Caldwell et al. ............ 707/101
7,013,425 B2 *  3/2006 Kataoka ..................... 715/513
7,143,397 B2 * 11/2006 Imaura ....................... 717/136
7,188,158 B1 *  3/2007 Stanton et al. .............. 709/220

FOREIGN PATENT DOCUMENTS

| EP | 0 896 284 A | 2/1999 |
| EP | 0 928 070 A | 7/1999 |
| WO | WO 01/19052 A | 3/2001 |

OTHER PUBLICATIONS

Liefke, H. and Suciu, D., "An extensible compressor for XML data", Mar. 2000, ACM SIGMOD, Rec. 29, 1.*

(Continued)

*Primary Examiner*—Meng-Ai An
*Assistant Examiner*—KimbleAnn Verdi
(74) *Attorney, Agent, or Firm*—Gowling LaFleur Henderson LLP

(57) ABSTRACT

A method is described for sending compact messages based on predefined message definitions. The message definitions comprise a number of predefined fields each having a tag for one or more data values. The method comprises the following steps. Communication is established between a service and a device. A compact message including data values is prepared by: removing the tags associated with the data values; maintaining an order of the data values based on a predetermined sequence of the fields defined by the message definitions; and placing the data values in respective delimiters for differentiating between adjacent ones of the data values. The compact message is sent over the network for subsequent interpretation using a shared predetermined knowledge of the order of the fields from the message definition. A method for receiving compact messages, a system for implementing the methods, and a computer readable medium for storing instructions to carry out the methods are also described.

36 Claims, 7 Drawing Sheets

OTHER PUBLICATIONS

Liefke, H. and Suciu, D., "XMill: an efficient compressor for XML data", May 15-18, 2000, ACM SIGMOND, Proceedings of the 2000 ACM SIGMOD international Conference on Management of Data.*

Sundaresan, N. and Moussa, R., "Algorithms and programming models for efficient representation of XML for Internet applications", May 1-5, 2001, ACM Press, Proceedings of the 10th international Conference on World Wide Web.*

Fuhr, N. and Gövert, N., "Index compression vs. retrieval time of inverted files for XML documents", Nov. 4-9, 2002, ACM Press, Proceedings of the Eleventh international Conference on information and Knowledge Management.*

Girardot M et al: "Millau: An Encoding Format for Efficient Representation and Exchange of XML over the Web" Computer Networks, Elsevier Science Publishers B.V., Amsterdam, NL, vol. 33, No. 1-6, Jun. 2000 (2000-06).

Notification of Transmittal of the International Search Report and the Written Opinion of the International Searching Authority, or The Declaration for International Patent Application No. PCT/CA2004/000199, Jun. 21, 2004, 13 pages, International Searching Authority.

Notification of Transmittal of the International Preliminary Report on Patentability for International Patent Application No. PCT/CA2004/000199, Mar. 30, 2005, 7 pages, International Preliminary Examining Authority.

European Examination Report for European Patent Application No. 04710762.8, Jan. 26, 2006, 6 pages, European Patent Office.

* cited by examiner

SYSTEM AND METHOD OF COMPACT MESSAGING IN NETWORK COMMUNICATIONS BY REMOVING TAGS AND UTILIZING PREDEFINED MESSAGE DEFINITIONS

This application claims the benefits of earlier filed provisional application No. 60/503,777, filed Sep. 17, 2003, and Ser. No. 60/447,429, filed Feb. 14, 2003, which are herein incorporated by reference.

BACKGROUND

This application relates generally to network communications and communication devices and in particular to compacting messages for transfer to and from such devices.

As communication devices and the communication networks in which they are configured to operate continue to evolve, device users expect a wider range of functions from their devices. Modem mobile devices often enable such functions as web browsing, information downloading, and the like, that have typically been supported on larger and more powerful personal computers (PCs). However, PCs generally have larger and faster processors than wireless devices, and access to communication resources and power supplies that are less limited than those available on the wireless device. Further, applications become larger as computing power on PCs increases, thereby negating some of the resource advantages of PCs.

Supporting these types of functions and applications on wireless devices is not just a matter of porting a software application or operating system to the wireless devices. The underlying protocols, transfer mechanisms, and data formats upon which these functions are based are not often optimized for wireless communications. For example, eXtensible Markup Language (XML) is quickly becoming one of the most common schemes for exchanging data between different computer systems, but is characterized by a relatively large document size and thus is not suitable for transfer over wireless or other narrowband communication systems. Transfer of large amounts of data consumes limited device resources, both in the wired and wireless devices, including both communication resources and power resources. Therefore, there remains a need for more efficient transfer of information to and from network devices.

The systems and methods as disclosed herein provide compact messaging in network communications to obviate or mitigate at least some of the above presented disadvantages.

SUMMARY

A method of compact messaging between a schema-based service and a device over a network is provided, the device and the service having a predetermined knowledge of element descriptors shared between the device and the service based on a structured definition language. The method comprises the steps of: establishing communication between the service and the device; preparing a compact message including element data values by removing the element descriptors associated with the element data values; maintaining an order of the element data values based on a predetermined sequence of the element descriptors and the element data values; placing the element data values in respective delimiters for differentiating between adjacent ones of the element data values, the delimiters indicating a start and an end of a given sequence of the element data values; and sending the compact message over the network for subsequent interpretation upon reception using the shared predetermined knowledge of the element descriptors.

Also disclosed herein is provided a method of compact messaging between a schema-based service and a device over a network, the device and the service having a predetermined knowledge of element descriptors shared between the device and the service based on a structured definition language. The method comprises the steps of: receiving a compact message over the network including element data values having absent element descriptors associated with the element data values, adjacent ones of the element data values differentiated by respective delimiters, the delimiters indicating a start and an end of a given sequence of the element data values; using the shared predetermined knowledge of the element descriptors for reconstructing the compact message by associating the contained element data values with the respective element descriptors, an order of the element data values based on a predetermined sequence of the element descriptors and the element data values; and interpreting the reconstructed compact message for subsequent use in a runtime environment.

A method of compact messaging between a schema-based service and a device over a network is further provided, the device and the service having a predetermined knowledge of element descriptors shared between the device and the service based on a structured definition language. The method comprises the steps of: means for establishing communication between the service and the device; means for preparing a compact message including element data values and absent element descriptors; means for maintaining an order of the element data values based on a predetermined sequence of the element descriptors and the element data values; means for placing the element data values in respective delimiters for differentiating between adjacent ones of the element data values; and means for sending the compact message over the network for subsequent interpretation upon reception.

Also provided is a method of compact messaging between a schema-based service and a device over a network, the device and the service having a predetermined knowledge of element descriptors shared between the device and the service based on a structured definition language. The method comprises the steps of: means for receiving a compact message over the network including element data values having absent element descriptors, adjacent ones of the element data values differentiated by respective delimiters; means for using the shared predetermined knowledge of the element descriptors for reconstructing the compact message, an order of the element data values based on a predetermined sequence of the element descriptors and the element data values; and means for interpreting the reconstructed compact message for subsequent use in a runtime environment.

A computer program product for configuring a terminal device for compact messaging between a schema-based service and the device over a network is also disclosed, the device and the service having a predetermined knowledge of element descriptors shared between the device and the service based on a structured definition language. The computer program product comprises: a computer readable medium; a compact message module stored on the computer readable medium for preparing a compact message including element data values by removing the element descriptors associated with the element data values; and the module for configuring the device to maintain an order of the element data values based on a predetermined sequence of the element descriptors and the element data values according to the structured definition language, the element data values configured for placing in respective delimiters for differentiating between adjacent ones of the element data values, the delimiters indicating a start and an end of a given sequence of the element data values.

BRIEF DESCRIPTION OF THE DRAWINGS

These and other features of the exemplary systems and methods disclosed herein will become more apparent in the following detailed description in which reference is made to the appended drawings wherein:

FIG. 3b is a further example of the system topology of FIG. 3a;

FIG. 5 is a block diagram of a device message converter of FIG. 3a;

FIG. 6 is a block diagram of a compact serialization service module of FIG. 3a.

DESCRIPTION

Network System

Figure 1:
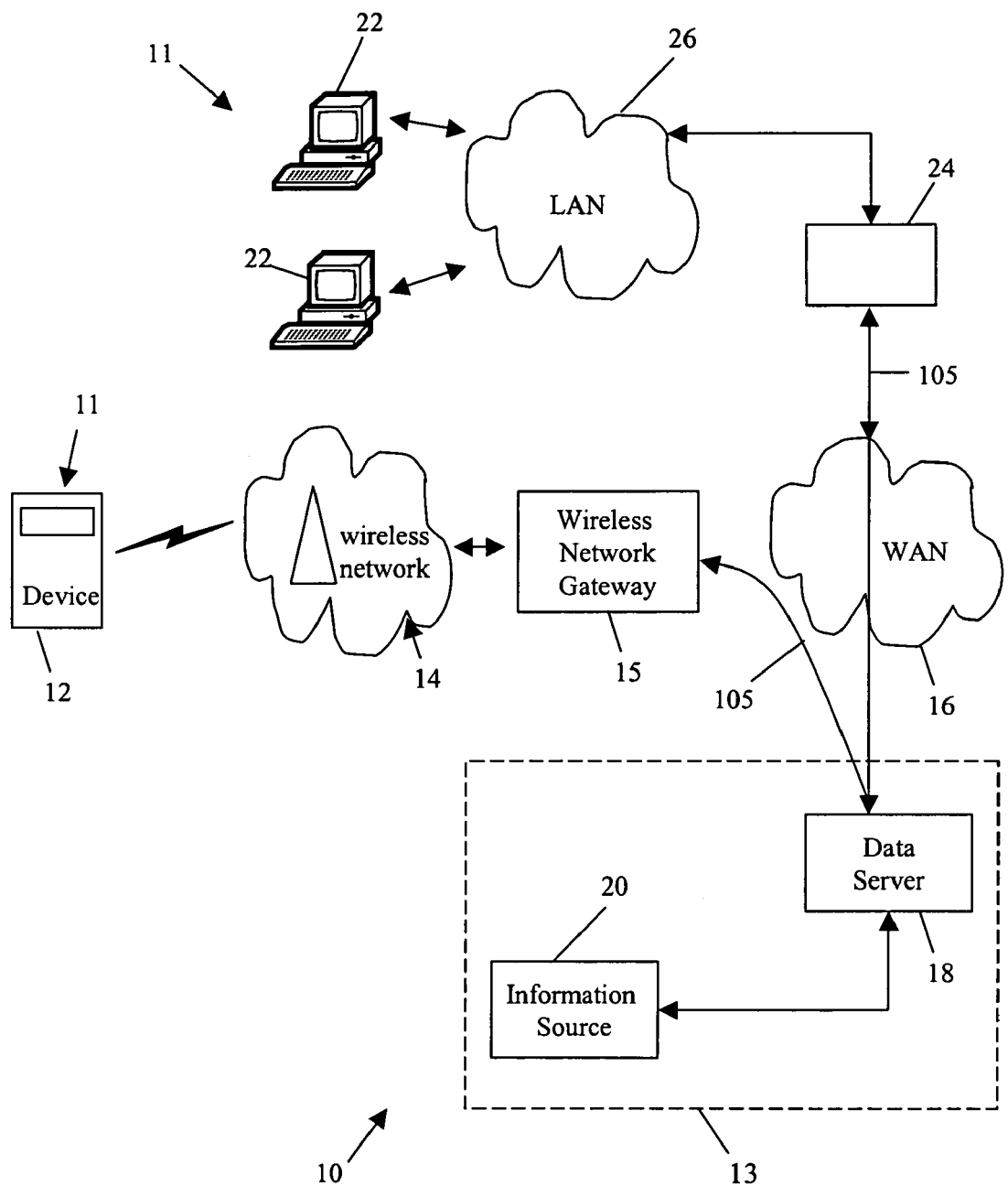
FIG. 1 is a block diagram of a network system.

Referring to FIG. 1, a network system 10 comprises a plurality of generic terminal devices 11 for interacting with one or more generic information services 13, provided by a data server 18 and associated information source 20, through request/response messages 105 via a coupled Wide Area Network (WAN) 16 such as but not limited to the Internet. The data server 18 effectively provides the devices 11 with access to the information source 20 of the information service 13. The generic terminal devices 11 can be such as but not limited to personal computers 22, wireless devices 12, PDAs, self-service kiosks and the like. The generic information service 13 can be Web Services and/or other services such as but not limited to SQL Databases, IDL-based CORBA and RMI/IIOP systems, and COM/DCOM components. Further, the system 10 can have a network gateway 24 for connecting the desktop computer terminals 22 via a Local Area Network (LAN) 26 to the information services 13. Further, the system 10 can also have a wireless network 14 for connecting the wireless devices 12 to the WAN 16.

The wireless devices 12 are wireless communication devices adapted to operate within the wireless communication network 14, such as a two-way communication device having at least data and possibly voice communication capabilities, for example. A wireless network gateway 15 provides an interface between the wireless network 14 and the WAN 16, and performs such functions as wireless device addressing, and storing and forwarding data to and from the wireless devices 12. Depending on the functionality provided by the wireless device 12, it may operate such as but not limited to a data messaging device, a two-way pager, a mobile telephone with data messaging capabilities, a wireless Internet appliance, a data communication device (with or without telephony capabilities), and/or a wireless modem configured to operate in conjunction with a computer system or other electronic device, however herein is referred to the wireless device 12. It is recognized that other devices and computers (not shown) could be connected to the data server 18 via the WAN 16 and associated networks other than as shown in FIG. 1. The generic terminal devices 11, wireless devices 12 and personal computers 22 are hereafter referred to collectively as "the devices 11" for the sake of simplicity. Web services are selected by example to represent the information message in the following description of the system 10, for the sake of simplicity. However, it is recognized that other generic information services could be substituted for the web services, if desired. Further, the networks 14, 16, 26 of the system 10 will hereafter be referred to collectively as "the network 16" for the sake of simplicity.

Referring again to FIG. 1, the devices 11 transmit and receive the request/response messages 105, respectively, when in communication with the data server 18 of the web services 13. The devices 11 can operate as web clients of the web services 13 by using the request/response messages 105 in the form of message header information and associated data content, for example requesting and receiving product pricing and availability from an on-line merchant. The web service 13 is an example of a system with which client application programs 302 (see FIG. 2) on the devices 11 interact via the network 16 in order to provide utility to users of the devices 11.

For satisfying the appropriate request/response messages 105 of the web service 13, the data server 18 can communicate with the information source 20 through various protocols (such as but not limited to HTTP and component API) for exposing relevant business logic (methods) to client application programs 302 (see FIG. 2) of the devices 11. Through the data server 18, the devices 11 may access any information source 20 that can communicate with the data server 18. The data server 18 can also contain the web service 13 interface software, such as but not limited to WSDL and BPEL. The information source 20 may be a local data store at the data server 18, or a remote store associated with a web server (not shown), for example.

Further, the data server 18 and the information source 20 may comprise a distributed web service 13 and communicate through a network, including the Internet, rather than the direct connection as shown in FIG. 1. The information source 20 can be considered a source from which data is available to the device 11. This data may be either requested by the device 11 or sent to the device 11 by the information source 20 without first being requested. It will be appreciated that the information source 20 could incorporate the data server 18 or some other means to facilitate data exchange for the web service 13, if desired.

The application programs 302 (see FIG. 2) of the device 11 can use the business logic of the information source 20 similarly to calling a method on an object (or a function). It is recognized that the client application program 302 can be downloaded/uploaded in relation to the information source 20, through the messages 105 via the network 16, directly to the devices 11. It is further recognized that the devices 11 can communicate with one or more web services 13 via the network 16. It is also recognized that the devices 11 could be directly coupled to the information source 20, thereby bypassing the data servers 18, if desired. In alternative implementations, functions of the data server 18 can be incorporated into the gateways 15, 24 or the information source 20, as described below.

Server Environment

In general, web services 13 have come as a replacement for legacy Browser-based and Client-Server TCP/IP connected infrastructure and applications. Originally started as a generic machine-to-machine (M2M) communication protocol, web services 13 are becoming a standard for any service-to-service (S2S) or service to consumer (S2C) communications. Based on a set of standard protocols (e.g. WSDL, SOAP, UDDI), web services 13 can provide a platform neutral communication pipe, for example XML-based, that can support synchronous and/or asynchronous communication messages 105. The system 10 of FIG. 1 relates preferably to the S2C model and deals with the consumer of the web service 13 operating from some generic terminal device 11.

Referring to FIG. 1, the web service 13 provides the information messages 105 which are used by the client application programs 302 (see FIG. 2) of the devices 11. Alternatively, or in addition, the web service 13 may receive and use the information messages 105 provided by the devices 11, or perform tasks on behalf of client application programs 302 executed on the devices 11. The web service 13 can be considered a software service of the data server 18, which can implement an interface that in some implementations can be expressed using Web Services Description Language (WSDL) registered in Universal Discovery Description and Integration (UDDI), and can communicate through messages 105 with client devices 11 by being exposed over the network 104 through a suitable communication protocol such as the Simple Object Access Protocol (SOAP). SOAP is a specification that defines the XML format for the messages 105, including a well-formed XML fragment enclosed in SOAP elements. Other parts of SOAP specify how to represent program data as XML and how to use SOAP to do Remote Procedure Calls (RPC). These optional parts of SOAP are used to implement RPC-style applications where a SOAP request message 105 containing a callable function, and the parameters to pass to the function, is sent from the client device 11, and the web service 13 returns the response message 105 with the results of the executed function. SOAP also supports document style applications where the SOAP message 105 is a wrapper around an XML document. A further optional part of SOAP defines the HTTP binding (i.e. header), whereas some SOAP implementations support MSMQ, MQ Series, SMTP, or TCP/IP transport protocols. Alternatively, the web service 13 may use other known communication protocols, message 105 formats, and the interface may be expressed in other web services languages than described above for communication with the devices 11.

Communication Device

Referring to again to FIGS. 1 and 2, the devices 11 are devices such as but not limited to mobile telephones, PDAs, two-way pagers or dual-mode communication devices. The devices 11 include a network connection interface 200, such as a wireless transceiver or a wired network interface card or a modem, coupled via connection 218 to a device infrastructure 204. The connection interface 200 is connectable during operation of the devices 11 to the network 16, such as to the wireless network 14 by RF links, which enables the devices 11 to communicate with each other and with external systems (such as the web service 13) via the network 16 and to coordinate the request/response messages 105 between the client application programs 302 and the web service 13. The network 16 supports the transmission of data in the request/response messages 105 between devices 11 and external systems, which are connected to the network 16. The network 16 may also support voice communication for telephone calls between the devices 11 and devices which are external to the network 16. The particular design of the network connection interface 200 within the wireless devices 12 will be dependent upon the wireless communication network 14 in which the wireless device 12 is intended to operate. For example, the wireless device 12 destined for a North American market may include the network connection interface 200 designed to operate within the Mobitex TM mobile communication system or DataTAC TM mobile communication system, whereas the wireless device 12 intended for use in Europe may incorporate a General Packet Radio Service (GPRS) the network connection interface 200. Other types of wireless devices and data transmission protocols are also contemplated, such as but not limited to CDMA.

Referring again to FIG. 2, the devices 11 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, a mouse, a microphone and the user output device such as an LCD screen display and/or a speaker. If the screen is touch sensitive, then the display can also be used as the user input device as controlled by the device infrastructure 204. The user interface 202 is employed by the user of the device 11 to coordinate the requests/response message messages 105 over the system 10 (see FIG. 1) as employed by client application programs 302 of a client runtime environment 206, further described below.

Referring again to FIG. 2, operation of the device 11 is enabled by the device infrastructure 204. The device infrastructure 204 includes a computer processor 208 and an associated memory module 210. The computer processor 208 manipulates the operation of the network interface 200, the user interface 202 and the client runtime environment 206 of the device 11 by executing related instructions, which are provided by an operating system and client application programs 302 located in the memory module 210. Further, it is recognized that the device infrastructure 204 can include a computer readable storage medium 212 coupled to the processor 208 for providing instructions to the processor 208 and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination. It is also recognized that the instructions to the processor 208 and/or to load/update client application programs 302 in the memory module 210 can be provided over the network 16 (see FIG. 1) by the web service 13 (or third party source) to configure the device 11 for interaction with the web services 13.

Figure 2:
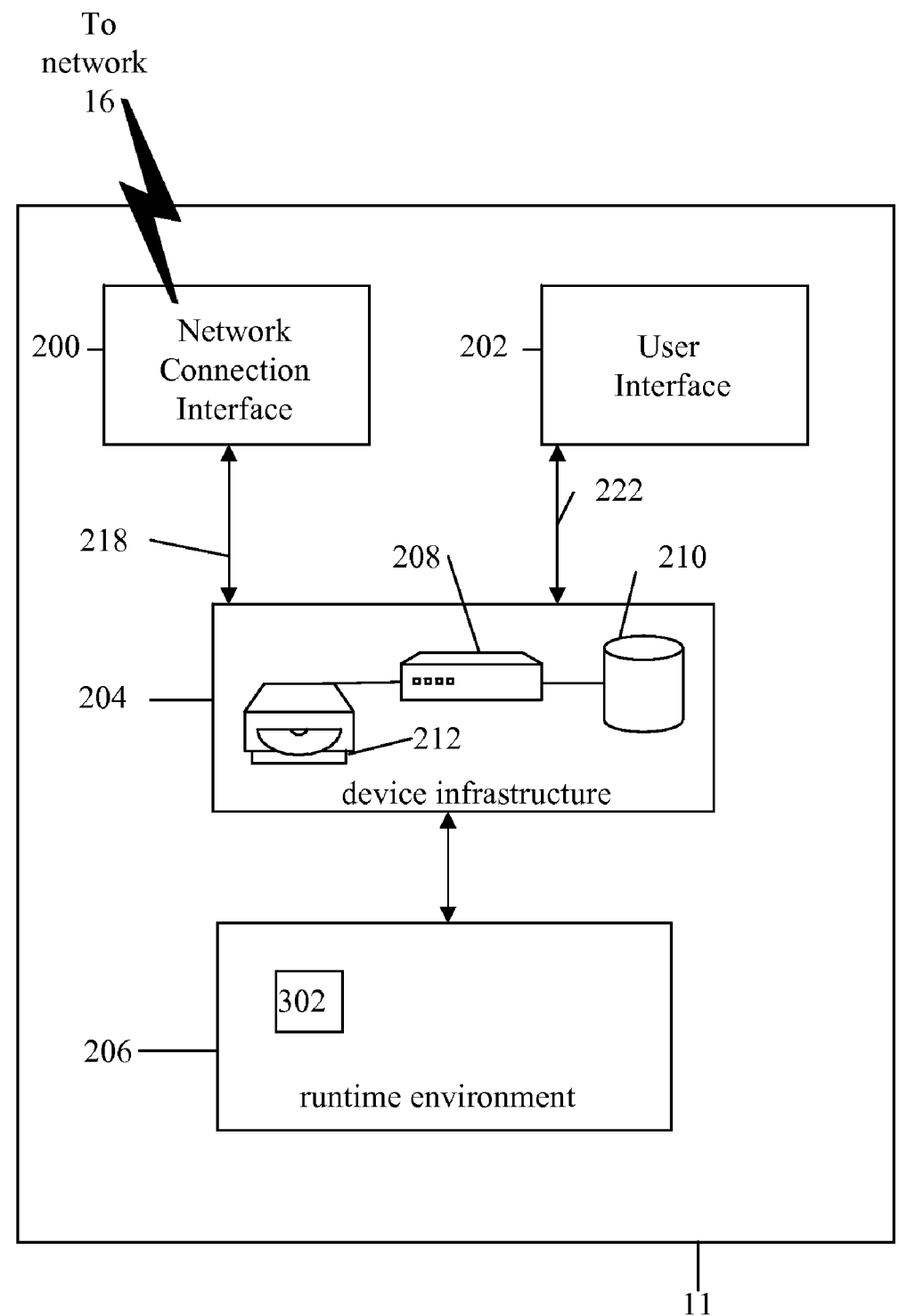
FIG. 2 is a block diagram of a device of the system of FIG. 1.

Referring to FIG. 2, the device 11 executes the application programs 302 by the client runtime environment 206, which converts the applications 302 into native code, which is executed by a processor 208 in the device infrastructure 204. Alternatively, the applications 302 may be executed as native code or interpreted by another software module or operating system on the device 11. In any event, the component applications 302 are run in the terminal runtime environment provided by the device 11.

Referring again to FIG. 1, the client runtime environment provided by the devices 11 can be configured to make the devices 11 operate as web clients of the web services 13. The client runtime environment of the devices 11 is preferably capable of generating, hosting and executing the client application programs 302 on the device 11. Further, specific functions of the client runtime environment can include such as but not limited to support for language, coordinating memory allocation, networking, management of data during I/O operations, coordinating graphics on an output device of the devices 11 and providing access to core object oriented classes and supporting files/libraries. Examples of the runtime environments implemented by the devices 11 can include such as but not limited to Common Language Runtime (CLR) by Microsoft and Java Runtime Environment (JRE) by Sun Microsystems, which facilitate generation, transmission, and reception of the network messages 105 between the web service 13 and the devices 11.

Compact Message Architecture

Figure 3A:
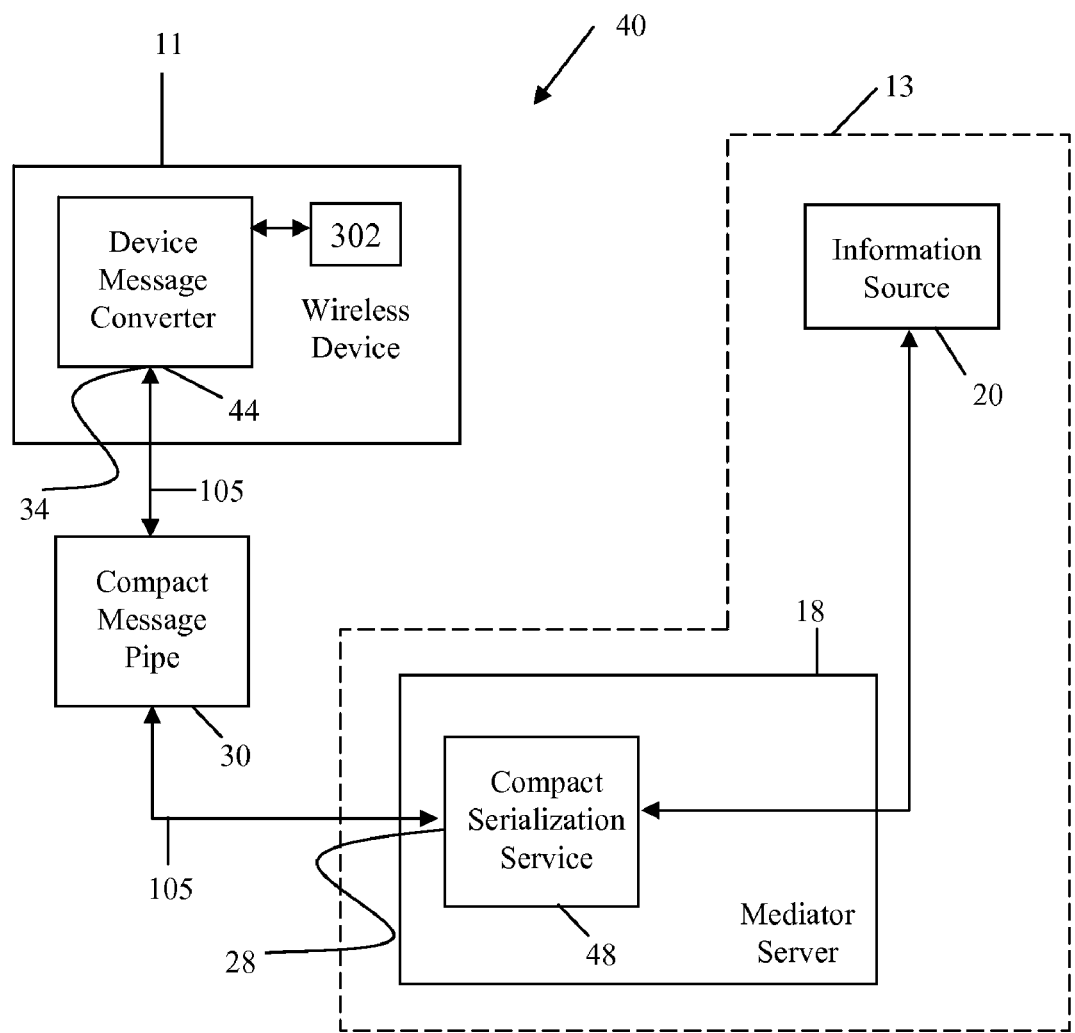
FIG. 3a is a block diagram of a first compact messaging system topology of the system of FIG. 1.

Referring to FIG. 3a, a simplified representation of the system 10 of FIG. 1, one fundamental concept of compact messaging is that documents or the "messages" 105 are reduced to an elementary representation to alleviate overhead in transmission. The original encoding syntax for these messages 105 prior to compaction can be entirely arbitrary, so long as the syntax accords to a structured definition language. As such, a compact messaging system 40 has far-reaching application, in that it provides a solution for adapting Web Services 13, SyncML or any other so-called "chatty" but predefined protocol to wireless or other types of constrained communication links. Compact messages 105 can be exchanged over any wireless or wired physical pathway with the introduction of a compact message pipe 30 (implemented over the network 16—see FIG. 1). Each endpoint 28, 34, data server 18 and device 11 respectively, of the pipe 30 define the boundaries of shared knowledge of metadata definitions inherent in the structured definition language, upon which the messages 105 are based.

The structured definition language can be used to construct the messages 105 as a consecutive series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the messages 105 to be processed by a device message converter 44 and a compact serialization service 48, and encoding schemes include such as but not limited to XML, HTML, XHTML, XSML, RDF, Machine Readable Cataloging (MARC), WSDL, SOAP, and Multipurpose Internet Mail Extensions (MIME).

Referring again to FIG. 3a, the mediator service endpoint 28 terminates the compact message pipe 30 facing the information source 20. This endpoint 28 distinguishes the boundary at which compact messages 105 are transmitted to and received from the device 11. The compact messaging pipe 30 is a bi-directional pathway through which compact messages 105 flow. The compact messaging pipe 30 exists between messaging endpoints 28, 34 terminating on the data server 18 (acting as a mediator server) and the device 11. The endpoints 28 and 34 are responsible for message 105 reduction and recovery, as described below. The compact messaging pipe 30 is not necessarily tied to a particular physical topology, wireless or otherwise, although its benefits can be particularly pertinent to wireless and other constrained communication media. The device endpoint 34 terminates and originates compact messages 105 used by the device 11, or more commonly software applications 302 (see FIG. 2) installed on the device 11. This endpoint 34 shares knowledge of the compact message 105 format (based on the shared structured definition language) with the mediator service endpoint 28. Predictability of the compact encoding scheme based on this shared knowledge enables conversion or "marshalling" and "un-marshalling" of data contained in the messages 105 between the original non-compact and compact message 105 formats.

Referring again to FIG. 3a, the device message converter 44 and the compact serialization service 48 of the compact messaging system 40 operate at the opposing endpoints 34, 28 of the compact message pipe 30. The device message converter 44 and the compact serialization service 48 have predetermined knowledge of the order and syntax of the descriptors in the structured definition language shared between them. It is recognised that this predetermined knowledge can be prior to initiation of message 105 transmission, and/or can be an initial component header of the message 105 once received, thereby alerting the receiving party of the expected content format of the compacted message 105. As described above, the device message converter 44 and the compact serialization service 48 have knowledge of the original message 105 format, and the converter 44 and the service 48 operate by removing or restoring overhead information in the message to compress the overhead information while retaining the contained message data according to the shared structured definition language. Therefore, endpoint 28, 34 mapping and unmapping operations are matched, and the original message format is predefined and predictable.

Referring to FIG. 3a, the device message converter 44, exists on the device 11 to integrate compact messages 105 with the device 11. The device converter 44 can be implemented as software in the runtime environment 206 (see FIG. 2) of the device 11 and/or can be part of the operating system of the device infrastructure 204. It is recognized that the device converter 44 could also be implemented as hardware, or as a combination of hardware and software. The device message converter 44 either passes compact messages 105 to other systems or software applications 302 on the device 11 or first converts the compact messages 105 back into the original message format associated with the information source 20 (see FIG. 1) messages and then passes the converted messages 105 to the other systems or applications 302.

Figure 5:
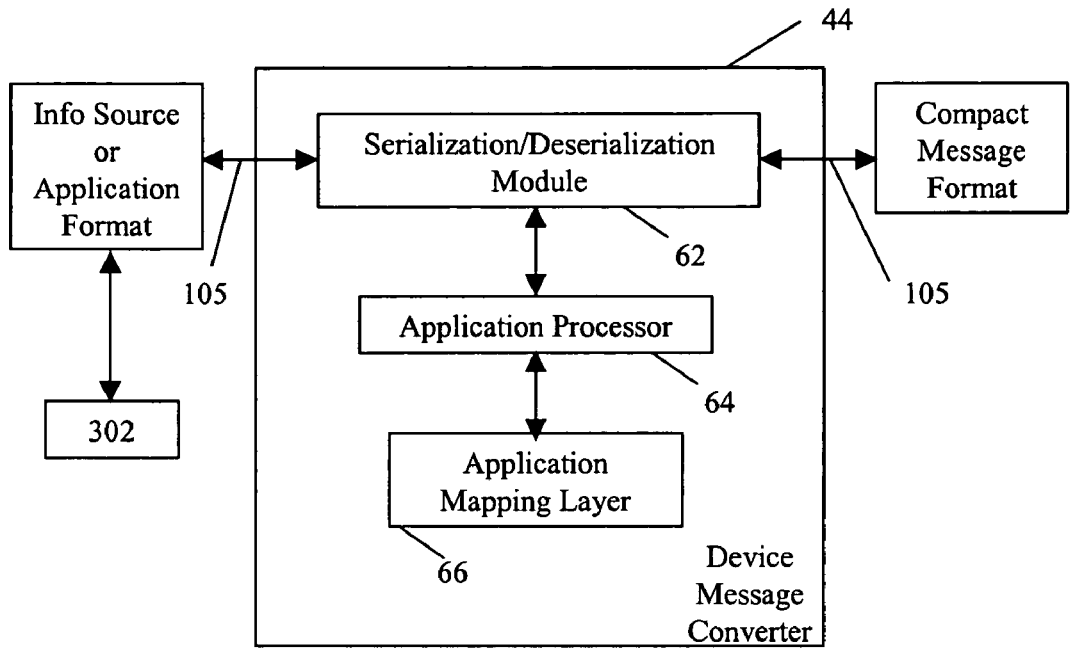

Referring to FIG. 5, the conversion function of the device message converter 44, as described below, may be dependent upon the original format (i.e. from the information source 20) or the destination system or application of the device 11. The message converter 44 operates in either of two modes. In the first mode, the compact message 105 is decompacted to the original message format by a serialization/deserialization module 62, and is then passed by the message converter 44 to the specific software application 302 using the decompacted message 105. The serialization/deserialization module 62 manages the compaction/decompaction of messages 105 received by or to be transmitted from the device 11. In the second mode, compact messages 105 are used directly by the software applications 302 on the device 11, thereby bypassing the decompaction process of the module 62. It is further recognized that some systems or software applications 302 on the device 11 may be configured to process compact message 105 formats, whereas others may be configured for the original uncompacted message 105 formats provided by the information source 20 (see FIG. 1).

Referring again to FIG. 5, the device message converter 44 includes the serialization/deserialization module 62 coupled to an application processor 64, which acts as a translator for the software applications 302 interacting with the messages 105. The message converter 44 also has an application mapping layer 66, which is used by the application processor 64 to effect translation of the messages 105, if required. The application mapping layer 66 holds mapping information used by the application processor 64 for conversion of the messages 105 to and from other defined message formats (i.e. between the information source 20 format and the software applications 302 format on the device 11). Received compact messages 105 are exchanged with other device 11 components or software applications 302 in the original information source format (i.e. as received) or may be passed to the application processor 64 for conversion where the recipient application 302 on the device 11 specifies its own message format. Similarly, outgoing messages 105 in other formats are passed to the application processor 64 for conversion into the information source format and then sent to the module 62 for compaction, for example, thereby producing the converted/compacted message 105 for transmission over the message pipe 30 (see FIG. 3a). It is recognized that the application processor 64 can operate on the compacted or decompacted version of the message 105 for format conversion purposes.

Referring again to FIG. 3a, the mediator server 18 is a component in the operation of compact messaging system 40. The mediator server 18 provides the pipe endpoint 28 that is exposed to the information source 20, or other service providers, for delivering compact messages 105 to the device 11. The mediator server 18 has the compact serialization service 48, which maintains a set of application maps 69 (see FIG. 6) that allow original message formats, preferably multiple message formats for a variety of structured definition languages, such as but not limited to XML or Simple Object Access Protocol (SOAP), to be compacted and transmitted to the device 11 as messages 105.

Figure 6:
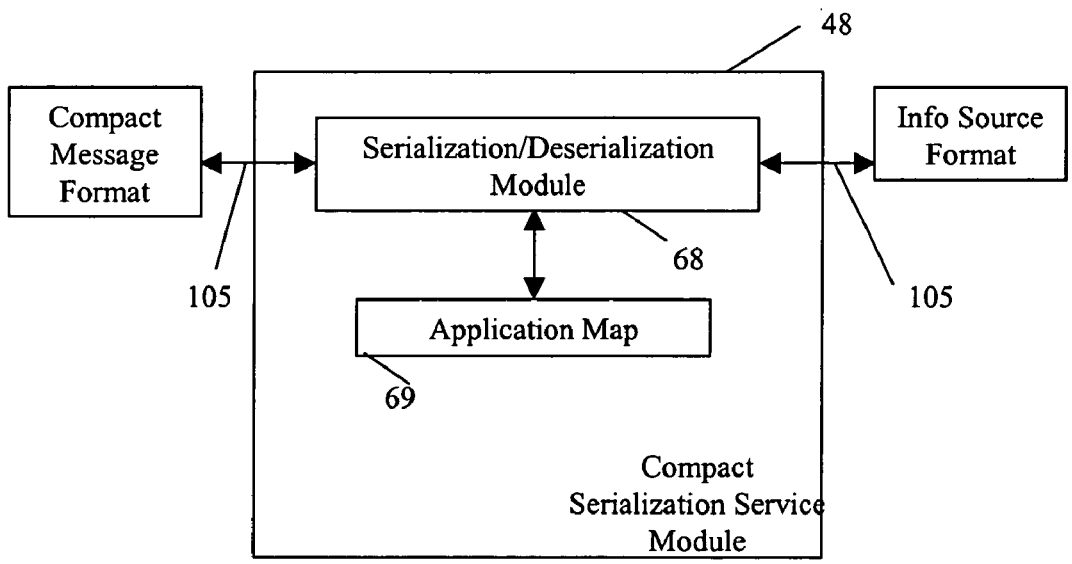

Referring to FIG. 6, the compact serialization service module 48 of the mediator service 18 (see FIG. 3a) transforms messages 105 received from the information source 20, expressed in an information source format, into compact messages, and vice-versa. A serialization/deserialization module 68 performs the compaction/decompaction of the messages 105, and the application maps 69 hold mapping information for conversion of compact messages 105 to and from defined message formats associated with one or more information sources 20, which can include a number of different structured definition languages. The application maps 69 provide a means to allow pluggable support for encoding/decoding of an arbitrary number of message formats.

Referring to FIGS. 1 and 3a, one example application of the compact messaging system 40 extends to transmission of XML messages 105 between the information source 20 of the web service 13 and the wireless device 12. In this scenario, the application maps 26 (see FIG. 6) on the mediator server 18 include an application map 26 that accepts the message format utilized by the information source 20. The message service and wireless device endpoints 28 and 34 operate in tandem to strip and restore overhead information from the XML message. In this example application, the mediator server 18 acts as an XML server and the wireless device 12 acts as an XML client, such that the message pipe 30 communicates a compacted message 105 based on shared knowledge of the XML metadata descriptors (i.e. the shared structured definition language), both sequence and meaning, of the XML syntax.

Figure 3B:
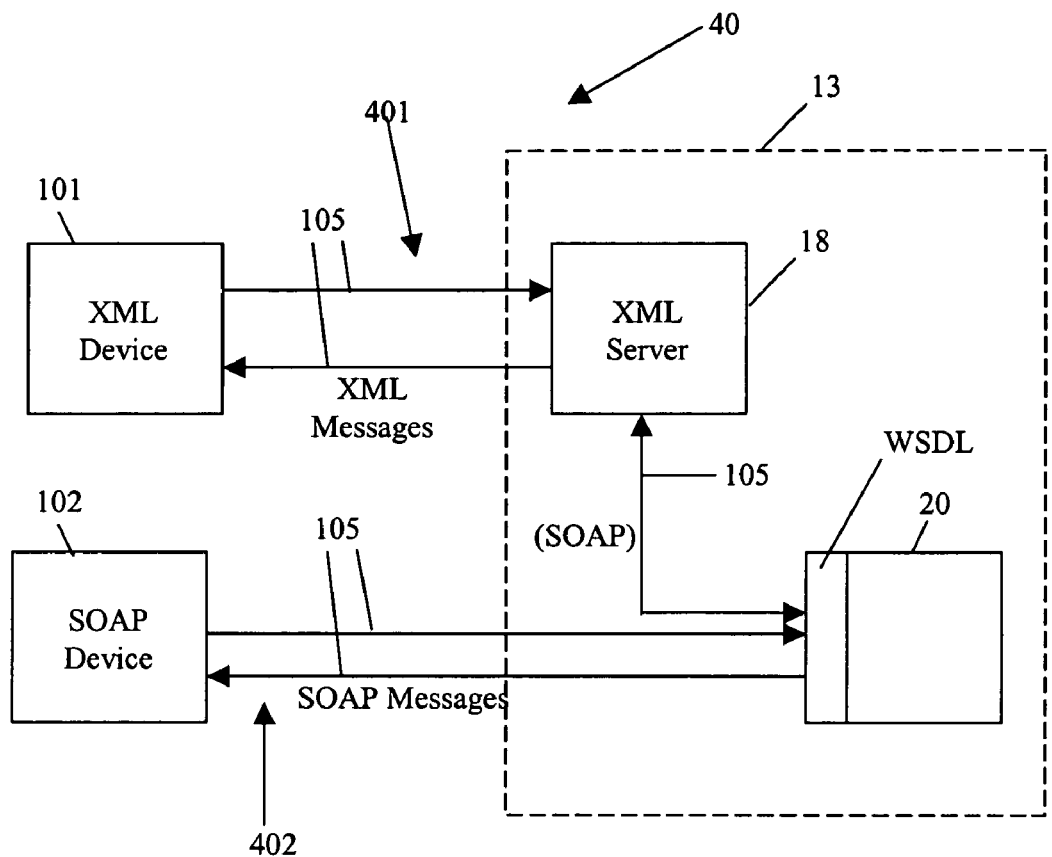

Referring to FIG. 3b, a further example of the compact messaging system 40 is shown, where there are an XML client device 101 and a SOAP client device 102, both of which are communicating with the web service 13. The compact messaging pipe 401 operates on shared knowledge of the XML structured definition language format, while the compact messaging pipe 402 operates on shared knowledge of the SOAP structured definition language format. The information source 20 has a WSDL interface for communicating directly with the SOAP client device 102, and communicates indirectly through the mediator server 18 with the XML client device 101. Accordingly, the mediator server 18 uses the application map 69 (see FIG. 6) for converting the message format of the SOAP message 105 (between the server 18 and the source 20) to XML. This conversion of structured definition language formats allows the SOAP based information source 20 to communicate compacted messages 105 with the XML client device 102, wherein the compacted messages 105 are processed based on the shared structured definition language used by the respective compact message pipe 401, 402.

Compact Message Protocol

A compact message definition of the shared structured definition language is used to marshal and un-marshal the compact message 105 successfully from the document (message 105). A compact message definition can have the following properties:
1. is identified by a unique name;
2. defines a list of mandatory fields that appear in the message 105;
    2.1. a field may be a nested message definition;
    2.22. a field may have multiplicity;
        2.2.1 the same field may occur multiple times;
        2.2.2 occurrences of this field are consecutive; and
    2.3. order of fields is maintained.

One possible mapping of the message to its compact form relies on use of the following delimiters, such as but not limited to: "<" denotes the start of a sequence; ">" denotes an end of a sequence; and "," separates multiple values in conjunction with ":" symbol to distinguish arrays.

Figure 7:
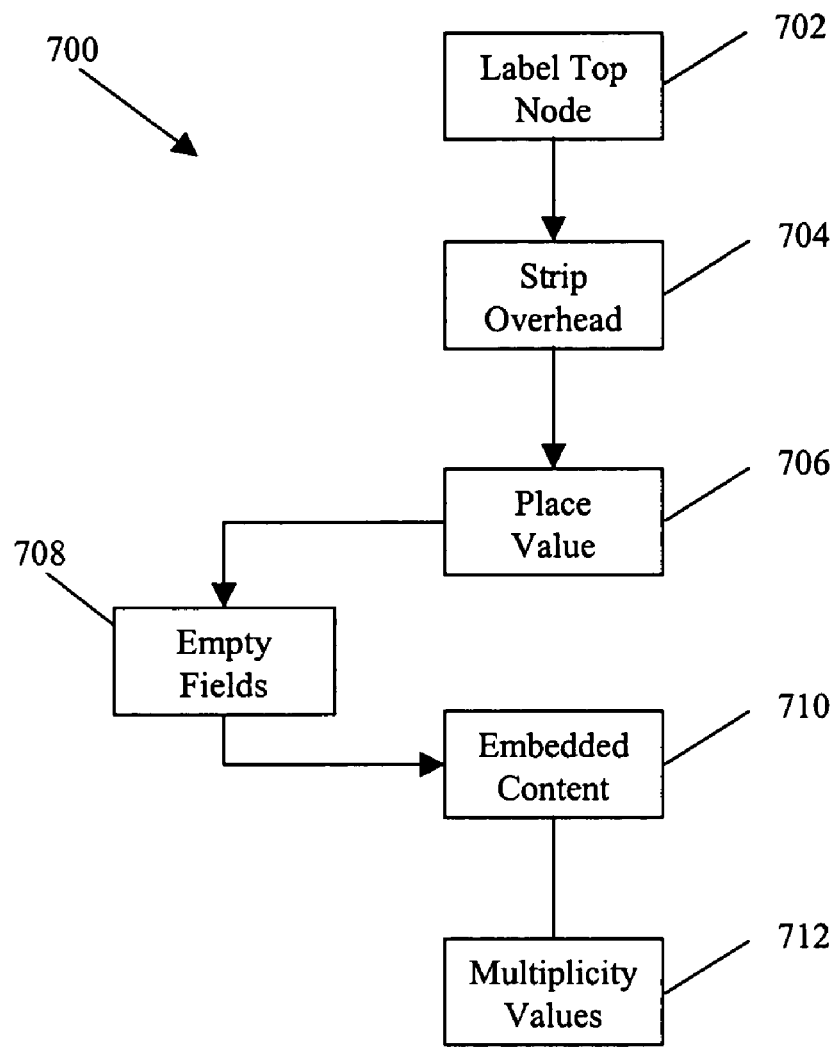
FIG. 7 is a flow diagram illustrating a compact messaging protocol.

Referring to FIG. 7, given a known message definition the message 105, for example XML, is preferably compacted using the following compacting message protocol 700:
1. the top node of the XML message 105 is labelled 702 with the message definition name so that the beginning of the XML document sequence is identified (observes point 1 above);
2. order of fields is maintained in a predefined sequence, retaining 704 the contained field data while stripping the overhead metadata syntax described by the XML definition (observes 2.3 above), recognizing that the field order sequence can be manipulated as long as manipulation details are shared between the converter 44 and service 48 (see FIG. 3a);
3. every contained field value within the message is placed 706 into the "< >" delimiters, for example;
4. fields that do not have a value are placed 708 as empty delimiters "< >" to observe 1 and 2 above, or are otherwise accounted for in order to maintain the predefined sequence of field order;
5. a field that represents an embedded message definition has all of its sub-fields delimited 710 within a pair of matching "< >" (observes 2.1 above); and
6. a field that has multiplicity is encoded 712 such that all of its multiple values are represented within delimiters "< >" and each of its values is further delimited by ","
(observes 2.2.1 and 2.2.2 above). An empty sequence
may be distinguished from a single null element by
including the ":" character, e.g. <:> is distinguished from
< >.

It is recognized that the protocol 700 assumes compaction
of the message 105 from the information source 20 to the
device 11. However, it should be apparent that the device
message converter 44 and the compact serialization service
48 (see FIGS. 5 and 6) could also preferably perform decompactions on messages 105, as well as processing messages
105 originating at the device 11 and destined for either the
information source 20 or another recipient (such as another
device 11 of the network 10—see FIG. 1) supporting the
original message format.

Compact Message Examples

The following example serves to illustrate how an XML
message of a predetermined structured definition language
format could be represented as the compact message 105, as
processed by the modules 62, 68 (see FIGS. 5 and 6).

EXAMPLE 1

A message definition describes a message called MyMsg.
MyMsg relies on two additional message definitions called
D1 and D2. The entire set of message definitions are defined
as follows in the structured definition language, including the
metadata tags F1, F2, F3, F4, F5, F6, D1, D2, G1, G2, G3, H1,
H2:

MyMsg:
   F1 field
   F2 field
   F3 field
   F4 a field permitting multiplicity of values
   F5 nested message definition D1
   F6 nested message definition D2, multiplicity permitted D1:
   G1 field
   G2 field
   G3 multiplicity permitted D2:
   H1 field
   H2 field In view of the above definition of MyMsg, an input message 105 to the mediator service endpoint 28 (for a message
transfer from the information source 20 to the device 11—see
FIG. 3a) may be as follows:

```
<MyMsg>
  <F1>val1</F1>
  <F2></F2>
  <F3>val3</F3>
  <F4>val41</F4><F4>val42</F4><F4>val43</F4>
  <D1>
    <G1>gval1</G1>
    <G2>gval2</G2>
    <G3>gval31</G3><G3>gval31</G3>
  </D1>
  <D2><H1>h1val1</H1><H2>h2val1</H2></D2>
  <D2><H1>h1val2</H1><H2>h2val2</H2></D2>
  <D2><H1>h1val3</H1><H2>h2val3</H2></D2>
</MyMsg>
```

It should be noted above that the non-compacted MyMsg
message 105 contains both field values "val" wrapped by the
meta data tags F1, F2, F3, F4, F5, F6, D1, D2, G1, G2, G3, H1,
H2 Accordingly, an equivalent compact MyMsg message 105
compacted according to the above compacting protocol 700
of FIG. 7 then appears as:

```
<MyMsg    (step 702)
 <val1>   (step 706)
 <>       (step 708)
 <val3>
 <val41,val42,val43> (step 712)
 < <gval1><gval2><gval31,gval32> >   (step 710)
 < <<h/val1><h2val1>>,  (steps 710 and 712)
   <<h1val2><h2val2>>,
   <<h1val3><h2val3>> >
 >
``` while maintaining the order of fields using step 704. It should
be recognized that all of the meta data tags F1, F2, F3, F4, F5,
F6, D1, D2, G1, G2, G3, H1, H2 of the 105 have been
removed from the compacted version.

A similar approach may be used to compact SOAP messages using the WSDL definition for the information source
20. As an example, the WSDL for the Google ™ web service
13 is used below to illustrate how a SOAP message 105 may
be compacted. It should be noted in the below non-compacted
SOAP GoogleSearchResult message 105 how much storage
would be required for transmission, as compared to the compacted version containing only the field values.

EXAMPLE 2

This example shows how a GoogleSearchResult compact
message 105 would be formatted using the compacting message protocol 700 in FIG. 7. The definitions for GoogleSearchResult are taken directly from the WSDL file representing the structured definition language:

```
GoogleSearchResult:
<xsd:complexType name="GoogleSearchResult">
 <xsd:all>
  <xsd:element name="documentFiltering" type="xsd:boolean" />
  <xsd:element name="searchComments" type="xsd:string" />
  <xsd:element name="estimatedTotalResultsCount" type="xsd:int" />
  <xsd:element name="estimateIsExact" type="xsd:boolean" />
  <xsd:element name="resultElements"
   type="typens:ResultElementArray" />
  <xsd:element name="searchQuery" type="xsd:string" />
  <xsd:element name="startIndex" type="xsd:int" />
  <xsd:element name="endIndex" type="xsd:int" />
  <xsd:element name="searchTips" type="xsd:string" />
  <xsd:element name="directoryCategories"
   type="typens:DirectoryCategoryArray" />
  <xsd:element name="searchTime" type="xsd:double" />
 </xsd:all>
</xsd:complexType>
```

ResultElement and ResultElementArray:

```
<xsd:complexType name="ResultElementArray">
 <xsd:complexContent>
  <xsd:restriction base="soapenc:Array">
   <xsd:attribute ref="soapenc:arrayType"
    wsdl:arrayType="typens:ResultElement[]" />
  </xsd:restriction>
```

```
</xsd:complexContent>
</xsd:complexType>
<xsd:complexType name="ResultElement">
<xsd:all>
<xsd:element name="summary" type="xsd:string" />
<xsd:element name="URL" type="xsd:string" />
<xsd:element name="snippet" type="xsd:string" />
<xsd:element name="title" type="xsd:string" />
<xsd:element name="cachedSize" type="xsd:string" />
<xsd:element name="relatedInformationPresent" type="xsd:boolean" />
<xsd:element name="hostName" type="xsd:string" />
<xsd:element name="directoryCategory"
type="typens:DirectoryCategory" />
<xsd:element name="directoryTitle" type="xsd:string"/>
</xsd:all>
</xsd:complexType>
```

DirectoryCategory and DirectoryCategoryArray:

```
<xsd:complexType name="DirectoryCategoryArray">
  <xsd:complexContent>
    <xsd:restriction base="soapenc:Array">
      <xsd:attribute ref="soapenc:arrayType"
wsdl:arrayType="typens:DirectoryCategory[]"/>
    </xsd:restriction>
  </xsd:complexContent>
</xsd:complexType>
<xsd:complexType name="DirectoryCategory">
  <xsd:all>
    <xsd:element name="fullViewableName" type="xsd:string" />
    <xsd:element name="specialEncoding" type="xsd:string" />
  </xsd:all>
</xsd:complexType>
```

A sample result GoogleSearchResult message 105, in compact form, then appears as follows:

```
<GoogleSearchResult>
    <false>
    <some search comments>
    <3>
    <true>
    <    <    <summary string>
                <http://theurl>
                <snippet string>
                <title string>
                <cached size string>
                <true>
                <hostname string>
                <    <fullviewablename string>
                        <specialencoding string>
                >
                <directory title string>
         >,
         <    <another summary string>
                <http://theurl2>
                <another snippet string>
                <another title string>
                <another cached size string>
                <true>
                <another hostname string>
                <    <fullviewablename string2>
                        <specialencoding string2>
                >
                <another directory title string>
         >
    >
    <some search query string>
    <1>
    <3>
    <search tips>
```

```
    <    <    <fullviewablename string>
                <specialencoding string>
         >,
         <    <fullviewablename string b>
                <specialendoding string b>
         >,
         <    <fullvieablename string c>
                <specialencoding string c>
         >
    >
    <2.34>
>
```

Figure 4:
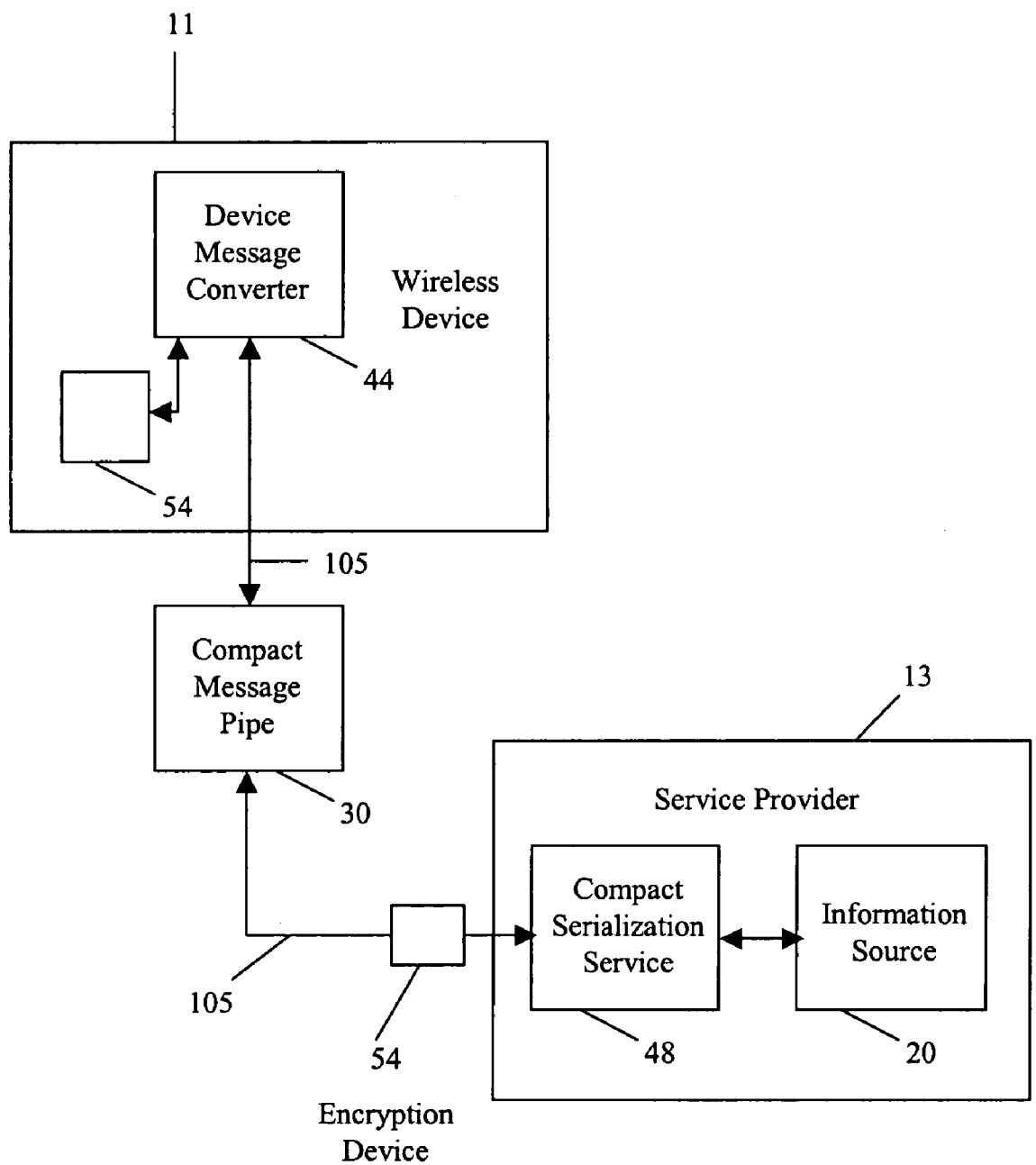
FIG. 4 is a block diagram of a second compact messaging system topology of the system of FIG. 1.

Referring to FIG. 4, a further example of the compact messaging system topology is shown. In the second topology a compaction serialization service module 48 is integrated with the information source 20 at the service provider 13. A mobile mediator service may be involved in the passing of compact messages 105 along the compact message pipe 30, but in this scenario acts as a simple pass-through. The wireless device 11 and its message converter 44 operate substantially as described above to integrate compact messages 105 with the device 11.

An integrated such as shown in FIG. 4 is particularly advantageous when confidential or otherwise sensitive information is provided by the information source 20. In this case, no intermediate component, such as the mediator server 18 (see FIG. 3a) is required to compact/decompact messages 105. For example, confidential information that is encrypted by an encryption module 54 at the service provider 13 remains encrypted until decrypted by a similar module 54 at the wireless device 11 and vice-versa, providing end-to-end security.

It will be appreciated that the above description relates to various systems, methods and manufacture by way of example only. Many variations on the system 10 and compacting message protocol 700 will be obvious to those knowledgeable in the field, and such obvious variations are within the scope of the systems and methods as described and claimed herein, whether or not expressly described. For example, although a single wireless device 12, data server 18 and information source 20 are shown in the figures, the data server 18 typically provides services for a plurality of devices 11,12, possibly via different communication networks 16, and access to a plurality of information sources 20 and associated web services 13 through different direct or network-based connections. Similarly, any network 16 and any information source 20 may communicate with multiple data servers 18. Although the wireless device 12, the wireless network 14, and the wireless network gateway 15 are shown in FIG. 1, the present systems and methods are also applicable to other types of network topologies, communication systems, and devices. For example, processing resources and communication link bandwidth tend not to be as limited for desktop computer systems and wired communication links as for wireless devices and wireless communication networks, but compressing the size of data also provides for faster transfer of documents via wired connections. Therefore, the systems and methods described herein may be implemented in conjunction with wired or wireless communication systems and devices.

Further, compact messaging systems find application in two topologies. The first topology applies to the situation that a mediator server 18 performs compaction of messages on behalf of the information source 20. In the second topology, the information source 20 itself compacts messages for delivery to the device 11. Although each topology is described separately, it should be understood that the device 11 may be configured to communicate with information sources 20 that support either topology. It is also contemplated that the device 11 may communicate with a plurality of information sources 20, of which some support the first topology, and others support the second topology.

The invention claimed is:

1. A method of sending compact messages based on predefined message definitions between a schema-based service and a device over a network, the message definition being shared between the device and the schema-based service prior to transmission of the compact message, the message definitions based on a structured definition language and comprising a number of predefined fields each having a tag for one or more data values, the method comprising the steps of:
   establishing communication between the schema-based service and the device;
   preparing a compact message including data values by removing the tags associated with the data values;
   maintaining an order of the data values based on a predetermined sequence of the predefined fields as defined by the message definitions;
   placing the data values in respective delimiters for differentiating between adjacent ones of the data values, the delimiters indicating a start and an end of a given sequence of the data values;
   labeling a top node of the compact message with a name of the message definitions for denoting a start of the sequence of the data values associated with the tags; and
   sending the compact message over the network for subsequent interpretation upon reception using the order of the predefined fields from the message definition.

2. The method of claim 1 wherein the structured definition language is adapted for indicating one or more of a limited number of the tags, a name of each tag, or a meaning for each tag.

3. The method of claim 1 wherein the structured definition language comprises; XML, HTML, XHTML, XSML, RDF, Machine Readable Cataloging (MARC), WSDL, OPEL, SOAP, or Multipurpose Internet Mail Extensions (MIME).

4. The method of claim 1 further comprising the step of placing tags that do not have a value as empty delimiters in the compact message for maintaining the predetermined sequence of the predefined fields.

5. The method of claim 4 further comprising the step of placing tags that do not have a value as empty delimiters further distinguished by an identifying character.

6. The method of claim 4 further comprising the step of delimiting all sub-fields of a field that represents an embedded message definition within a pair of matching delimiters.

7. The method of claim 6 further comprising the step of delimiting a tag that has multiplicity of consecutive data values such that each of its multiple data values are represented within a pair of matching delimiters and each of its contained data values are further delimited within the pair of matching delimiters.

8. The method of claim 1 wherein the compact message is prepared and interpreted at respective messaging endpoints associated with the schema-based service and the device, such that compact messaging is implemented on a bi-directional pathway.

9. The method of claim 8 further comprising the step of placing an indicator at the beginning of the compact message for identifying the structured definition language used for defining the predetermined knowledge of the message definition.

10. The method of claim 8 further comprising the step of interpreting the compacted message directly in a runtime environment by using the data values directly.

11. The method of claim 8 further comprising the step of selecting a message format for the structured definition language from a plurality of formats.

12. The method of claim 11 further comprising the step of converting between a first message format of an information source of the schema-based service and a second message format of the device.

13. The method according to claim 12, wherein the conversion between the first message format and the second message format is performed by the schema-based service.

14. The method of claim 7, wherein the schema-based service is a generic schema-based service comprising a web service, a database service, or a IDL based CORBA service.

15. The method according to claim 14, wherein the device comprises a personal computer, a wireless device, a PDA, a self-service kiosk, or a desktop terminal.

16. The method according to claim 15, wherein the device is configured as a client of the schema-based service.

17. The method according to claim 7, wherein the communication between the device and the schema-based service comprises synchronous communication or asynchronous communication.

18. A method of receiving compact messages, based on predefined message definitions, between a schema-based service and a device over a network, the message definitions being shared between the device and the schema-based service prior to transmission of the compact message, the message definitions based on a structured definition language and comprising a number of predefined fields each having a tag for one or more data values, the method comprising the steps of:
   receiving a compact message over the network including data values absent of tags associated with the data values, adjacent ones of the data valves being differentiated by delimiters, the delimiters indicating a start and an end of a given sequence of the data values;
   identifying a name of the message definitions using a top node of the compact message for denoting a start of the sequence of the data values associated with the tags;
   associating the data values with tags of the predefined fields of the message definitions by correlating an order of the data values with a predetermined sequence of the predefined fields as defined by the message definition; and
   interpreting the message for subsequent use in a runtime environment.

19. The method of claim 18, wherein the structured definition language is adapted for Indicating one or more of a limited number of the tags, a name of each tag, or a meaning for each tag.

20. The method of claim 18, wherein the structured definition language comprises; XML, HTML, XHTML, XSML, RDF, Machine Readable Cataloging (MARC), WSDL, SPEL, SOAP, or Multipurpose Internet Mail Extensions (MIME).

21. The method of claim 18 further comprising the step of interpreting tags that do not have a value as empty delimiters in the compact message for maintaining a predefined sequence of the field order.

22. The method of claim 21 further comprising the step of interpreting all sub-fields of a field that represents an embedded message definition within a pair of matching delimiters.

23. The method of claim 22 further comprising the step of interpreting a tag that has multiplicity of consecutive data values such that each of its multiple data values are represented within a pair of matching delimiters and each of its contained data values are further delimited within the pair of matching delimiters.

24. The method of claim 18, wherein the compact message is prepared and interpreted at respective messaging endpoints associated with the schema-based service and the device, such that compact messaging is implemented on a bi-directional pathway.

25. The method of claim 24 further comprising the step of reading an indicator at the beginning of the compact message for identifying the structured definition language used for defining the message definition.

26. The method of claim 24 further comprising decompacting the compact message for interpretation by inserting the tags associated with the data values.

27. The method of claim 24 further comprising the step of interpreting the compacted message directly in a runtime environment by using the data values directly.

28. The method of compact messaging according to claim 24 further comprising the step of selecting a message format for the structured definition language from a plurality of formats.

29. The method of compact messaging according to claim 28 further comprising the step of converting between a first message format of an information source of the schema-based service and a second message format of the device.

30. The method according to claim 29, wherein the conversion between the first message format and the second message format is performed by the schema-based service.

31. The method of claim 23, wherein the schema-based service is a generic schema-based service comprising a web service, a database service, or a IDL based CORBA service.

32. The method according to claim 31, wherein the device is a personal computer, a wireless device, a PDA, a self-service kiosk, or a desktop terminal.

33. The method according to claim 32, wherein the device is configured as a client of the schema-based service.

34. The method according to claim 23, wherein the communication between the device and the schema-based service comprises synchronous communication or asynchronous communication.

35. A computer storage medium comprising instructions for configuring a terminal device for sending compact messages based on predefined message definitions between a schema-based service and the terminal device over a network, the message definitions being shared between the terminal device and the schema-based service prior to transmission of the compact message, the message definitions based on a structured definition language and comprising a number of predefined fields each having a tag for one or more data values, the instructions, when executed on the terminal, cause the terminal device to implement the steps of:

establishing communication between the schema-based service and the terminal device;

preparing a compact message including data values by:

removing the tags associated with the data values;

maintaining an order of the data values based on a predetermined sequence of the predefined fields as defined by the message definitions;

placing the data values in respective delimiters for differentiating between adjacent ones of the data values, the delimiters indicating a start and an end of a given sequence of the data values;

labeling a top node of the compact message with a name of the message definitions for denoting a start of the sequence of the data values associated with the tags; and sending the compact message over the network for subsequent interpretation upon reception using the order of the predefined fields from the message definition.

36. A computer storage medium comprising instructions for configuring a terminal device for receiving compact messages, based on message definitions, between a schema-based service and the terminal device over a network, the message definitions being shared between the terminal device and the schema-based service prior to transmission of the compact message, the message definitions based on a structured definition language and comprising a number of predefined fields each having a tag for one or more data values, the instructions, when executed on the terminal device, cause the terminal device to implement the steps of:

receiving a compact message over the network including data values absent of tags associated with the data values, adjacent ones of the data values being differentiated by delimiters, the delimiters indicating a start and an end of a given sequence of the data values;

identifying a name of the message definitions using a top node of the compact message for denoting a start of the sequence of the data values associated with the tags;

associating the data values with tags of the predefined fields of the message definitions by correlating an order of the data values with a predetermined sequence of the predefined fields as defined by the message definition; and interpreting the message for subsequent use in a runtime environment.

\* \* \* \* \*